(12) United States Patent
Skog et al.

(10) Patent No.: US 12,052,749 B2
(45) Date of Patent: Jul. 30, 2024

(54) METHODS AND ARRANGEMENTS FOR MANAGING ROUND TRIP TIME ASSOCIATED WITH PROVISION OF A DATA FLOW VIA A MULTI-ACCESS COMMUNICATION NETWORK

(71) Applicant: Telefonaktiebolaget LM Ericsson (publ), Stockholm (SE)

(72) Inventors: Robert Skog, Hässelby (SE); Ala Nazari, Handen (SE); John Orre, Saltsjöbaden (SE); Marcus Ihlar, Älvsjö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 266 days.

(21) Appl. No.: 17/598,421

(22) PCT Filed: Apr. 1, 2019

(86) PCT No.: PCT/SE2019/050292
§ 371 (c)(1),
(2) Date: Sep. 27, 2021

(87) PCT Pub. No.: WO2020/204771
PCT Pub. Date: Oct. 8, 2020

(65) Prior Publication Data
US 2022/0183023 A1 Jun. 9, 2022

(51) Int. Cl.
*H04W 72/566* (2023.01)
*H04W 72/543* (2023.01)

(52) U.S. Cl.
CPC ....... *H04W 72/569* (2023.01); *H04W 72/543* (2023.01)

(58) Field of Classification Search
CPC ... H04L 47/283; H04L 47/11; H04L 47/6275; H04L 47/2441; H04L 47/32; H04L 47/31;
(Continued)

(56) References Cited

U.S. PATENT DOCUMENTS

| 8,681,610 B1 | 3/2014 | Mukerji |
| 11,419,010 B2 * | 8/2022 | Zhu ............... H04B 7/15542 |

(Continued)

FOREIGN PATENT DOCUMENTS

| WO | WO-2016141239 A1 * | 9/2016 | ......... H04L 43/0882 |
| WO | WO-2018172548 A1 * | 9/2018 | ......... H04W 28/0268 |

*Primary Examiner* — David Q Nguyen
(74) *Attorney, Agent, or Firm* — COATS & BENNETT, PLLC

(57) ABSTRACT

Methods and device(s) (110; 120; 130; 140; 141; 210; 212; 220; 230; 600) for managing Round Trip Time, RTT, associated with provision of a data flow (150; 250) from a server device (130; 230), via a multi-access communication network (100; 200), to a client device (120; 220). Said device(s) (110; 120; 130; 140; 141; 210; 212; 220; 230; 600) being communicatively connected to the multi-access communication network (100; 200) that is configured to provide the data flow (150; 250) to the client device (120; 220) using a resource of the multi-access communication network (100; 200) that is shared by multiple devices (120-121; 220-221). The device(s) (110; 120; 130; 140; 141; 210; 212; 220; 230; 600) initiates, in response to identification that the data flow (150; 250) belongs to a certain type, introduction of an artificial delay in the RTT.

16 Claims, 6 Drawing Sheets

(58) Field of Classification Search
CPC .... H04L 47/2433; H04L 47/12; H04W 80/06; H04W 8/04; H04W 72/569; H04W 72/543; H04W 28/082
USPC .............................. 370/328, 329, 330, 331
See application file for complete search history.

(56) References Cited

U.S. PATENT DOCUMENTS

| | | |
|---|---|---|
| 2006/0104313 A1 | 5/2006 | Haner et al. |
| 2017/0353874 A1* | 12/2017 | Harrang ............. H04L 43/0864 |
| 2019/0037054 A1* | 1/2019 | Bifulco ................ H04L 67/563 |
| 2019/0150150 A1* | 5/2019 | Calin ............... H04W 72/0453 |
| | | 370/329 |
| 2019/0238420 A1* | 8/2019 | Goldfarb ................ H04L 45/02 |
| 2020/0396169 A1* | 12/2020 | Tan ....................... H04L 47/283 |
| 2021/0153254 A1* | 5/2021 | Zhu ....................... H04L 5/0055 |

* cited by examiner

METHODS AND ARRANGEMENTS FOR MANAGING ROUND TRIP TIME ASSOCIATED WITH PROVISION OF A DATA FLOW VIA A MULTI-ACCESS COMMUNICATION NETWORK

TECHNICAL FIELD

Embodiments herein concern a method and arrangements relating to managing Round Trip Time, RTT, associated with provision of a data flow from a server device, via a multi-access communication network, e.g. a telecommunication network, to a client device.

BACKGROUND

Communication devices such as wireless communication devices, that simply may be named wireless devices, may also be known as e.g. user equipments (UEs), mobile terminals, wireless terminals and/or mobile stations. A wireless device is enabled to communicate wirelessly in a wireless communication network, wireless communication system, or radio communication system, e.g. a telecommunication network, sometimes also referred to as a cellular radio system, cellular network or cellular communication system. The communication may be performed e.g. between two wireless devices, between a wireless device and a regular telephone and/or between a wireless device and a server via a Radio Access Network (RAN) and possibly one or more core networks, comprised within the cellular communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type of Communication (MTC) devices, i.e. devices that are not associated with a conventional user.

The wireless device may be, for example, portable, pocket-storable, hand-held, computer-comprised, or vehicle-mounted mobile device, enabled to communicate voice and/or data, via the RAN, with another entity, such as another wireless device or a server.

The wireless communication network may cover a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is typically identified by one or more cell identities. The base station at a base station site may provide radio coverage for one or more cells. A cell is thus typically associated with a geographical area where radio coverage for that cell is provided by the base station at the base station site. Cells may overlap so that several cells cover the same geographical area. By the base station providing or serving a cell is typically meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Spécial Mobile), which may be referred to as 2nd generation or 2G.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The expression downlink (DL) may be used for the transmission path from the base station to the wireless device. The expression uplink (UL) may be used for the transmission path in the opposite direction i.e. from the wireless device to the base station.

In 3rd Generation Partnership Project (3GPP) Long Term Evolution (LTE), base stations, which may be referred to as eNodeBs or eNBs, may be directly connected to other base stations and may be directly connected to one or more core networks. LTE may be referred to as 4th generation or 4G.

The 3GPP has undertaken to evolve further the UTRAN and GSM based radio access network technologies, for example into evolved UTRAN (E-UTRAN) used in LTE.

Work is ongoing with developing a next generation wide area networks, which may be referred to as NeXt generation (NX), New Radio (NR), or fifth generation (5G).

The RAN scheduler divides scarce radio resources between wireless communication devices that e.g. are served by a base station of the RAN, e.g. all wireless communication devices that have something to send to and receive from servers on Internet. Consider traffic going from such server, or host, to a wireless communication device, corresponding to a client, served by the RAN, for example traffic with data relating to web surfing, video etc. As long as the wireless communication device has something to be sent from the server, it will be scheduled by RAN. This takes resources.

To deliver traffic, i.e. data, from hosts, e.g. servers, to clients, e.g. wireless communication devices, in bursts, and in between bursts do not send anything at all, saves resources in the RAN, and reduces the risk that any shared resource(s) becomes overloaded. The temporary idle time between bursts can be used by RAN to e.g. deliver traffic for another client, e.g. to another wireless communication device. This is especially good when a cell and/or base station associated with the shared resource is congested.

SUMMARY

In view of the above, an object is to provide one or more improvements in relation to the prior art, in particular to provide improvements regarding delivery of data, from a host, e.g. a server, to clients, e.g. wireless communication devices, over a shared resource in a multi-access communication network.

According to a first aspect of embodiments herein, the object is achieved by a method, performed by one or more devices, for managing Round Trip Time, RTT, associated with provision of a data flow from a server device, via a multi-access communication network, to a client device. Said one or more devices being communicatively connected to the multi-access communication network. The multi-access communication network being configured to provide the data flow to the client device using a resource of the multi-access communication network that is shared by multiple client devices. Said one or more devices initiates, in response to identification that the data flow belongs to a certain type, introduction of an artificial delay in the RTT.

According to a second aspect of embodiments herein, the object is achieved by a computer program comprising instructions that when executed by a processing circuit causes the first node to perform the method according to the first aspect.

According to a third aspect of embodiments herein, the object is achieved by a carrier comprising the computer program according to the second aspect.

According to a fourth aspect of embodiments herein, the object is achieved by one or more devices for managing RTT associated with provision of a data flow from a server device, via a multi-access communication network, to a client device. Said one or more devices being configured to be communicatively connected to the multi-access communication network. The multi-access communication network being configured to provide the data flow to the client device using a resource of the multi-access communication network that is shared by multiple client devices. Said one or more devices are further configured to initiate, in response to identification that the data flow belongs to a certain type, introduction of an artificial delay in the RTT.

According to a fifth aspect of embodiments herein, the object is achieved by a method, performed by a server device, relating to transmission of a data flow towards a client device. The server device provides data to be transported by the data flow. The server devices initiates transmission of the data flow comprising the provided data, towards the client device via a multiaccess communication network to which one or more devices for managing RTT associated with provision of the data flow are communicatively connected. The multi-access communication network being configured to provide the data flow to the client device using a resource of the multi-access communication network that is shared by multiple client devices. Said one or more devices being configured to initiate, in response to identification that the data flow belongs to a certain type, introduction of an artificial delay in the RTT.

The artificial delay will thus result in a longer RTT than else wold be the case. If the artificial delay is say X milliseconds (ms), e.g. the so called Retransmission TimeOut (RTO) or Probe TimeOut (PTO) will be extended, i.e. longer until timeout, based on X. The new timeout may be extended by a time that may correspond to X ms but not necessarily. As a result it can take longer, e.g. X ms longer, before the server device considers data packets it has sent as part of the data flow to be lost, e.g. when no acknowledgment has been received before RTO. In other words, there will be more time that can be used to deliver other data using the shared resource, e.g. to other of the multiple devices. Without the artificial delay there may be need for increased buffering in the multi-access communication network and/or some real-time critical data may not be able to deliver in time and/or there would be more retransmissions of data packets that would load the network and also the server that e.g. provides the data, but without actually improving the situation for the client device.

Embodiments herein are beneficially applied in combination with provision of the data flow in bursts to the client device Thanks to embodiments herein and the artificial delay, bursts can be used or a delay between the bursts can be increased, e.g. with X ms or based on X, without causing retransmissions. The increase time between bursts can be used to communicate data to/from the other multiple devices, or other data to/from the client device, using the resource, and without causing overload, resulting in e.g. data loss and/or retransmission and/or deteriorated performance in data delivery.

Embodiments herein are further beneficially applied in combination with wireless communication networks, e.g. 5G networks, where the number of devices sharing resources often vary over time as user move and change location, change habits etc, and there is often a resource sharing situation, where devices has to share a limited resource e.g. due to limited capacity and e.g. bandwidth limitations at base stations for serving wireless communication devices.

When the server device performs the method according to the fifth aspect, e.g. for delivering a video streaming service to the client device, advantages include that the server device may need to retransmit more seldom than else would be the case, hence saving bandwidth and transmission resources, e.g. reducing the risk of overloaded resource and e.g. better streaming over RAN. The client device, and e.g. a user thereof that is using the video streaming service, may in turn, thanks to this, experience a higher quality of service when using the service, e.g. as provided by a video streaming service provider.

As understood from the above, embodiments herein enable more efficient use of shared resource in multiple access networks and thus enable improved serving of multiple devices using a shared resource in a multiple access network. Embodiments herein are further versatile by being compatible with different transport protocols, e.g. both Transmission Control Protocol (TCP) and the so called QUIC protocol.

Embodiments herein thus provide improvements regarding the ability to deliver data from a host, e.g. a server, to clients, e.g. wireless communication device, over a shared resource in a multi-access communication network.

BRIEF DESCRIPTION OF THE DRAWINGS

Examples of embodiments herein are described in more detail with reference to the appended schematic drawings, which are briefly described in the following.

DETAILED DESCRIPTION

Figure 1:
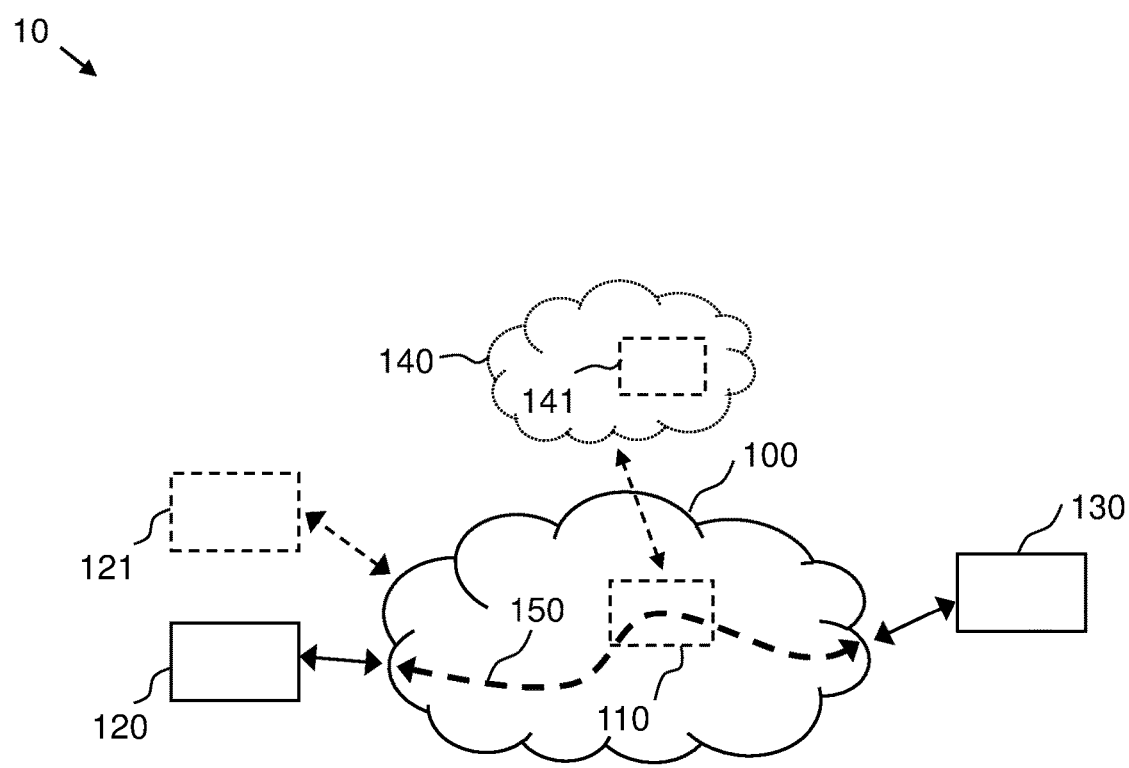
FIG. 1 is a block diagram schematically depicting an example of a first communication system to be used for discussing embodiments herein.

Throughout the following description similar reference numerals may be used to denote similar elements, units, modules, circuits, nodes, parts, items or features, when applicable. Features that appear only in some embodiments of what is shown in a figure, are typically indicated by dashed lines in the drawings.

Embodiments herein are illustrated by exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

As a development towards embodiments herein, the situation indicated in the Background will first be further elaborated upon.

The idle time between burst should at least not be greater than the so called Retransmission Time Out (RTO), since if it greater the transport protocol will assume that the packet is lost, re-transmit packet and change congestion window, e.g. reduce sending rate to client. RTO (Retransmission Time Out) is used by dominating transport protocols such as the Transmission Control Protocol (TCP) as a determining factor of how long a host, e.g. server, will wait before retransmitting the segment that it has not received. Whenever a packet is sent, the sender, i.e. the host, sets a timer corresponding to the RTO, which is a conservative estimate of when that packet will be acknowledged (acked), i.e. latest the packet must be acknowledged. The timer is reset every time the sender receives an acknowledgement. If the sender, i.e. host, does not receive an ack by then, it transmits that packet again, i.e. re-transmits it.

This problem is prominent in case of wireless communication networks, which typically has limited resources at fixed locations, e.g. at radio base stations, which resources are shared by all wireless communications devices in a proximity of each location at which the wireless communication devices e.g. are served by a radio base station. The wireless communication devices are in turn mobile with a number to be served that changes over time and often and with varying traffic generation, both as a group and individually over time. This means that the RAN and e.g. a limited resource or resources in e.g. a base station thereof, may be a bottleneck for communication in some situations and this is a risk that of course is desirable to reduce.

The corresponding problem exists also in other multi-access communication network configured to serve client devices with data traffic using a resource that is shared by multiple client devices.

The TCP is one of the main protocols of the Internet protocol suite. It originated in the initial network implementation in which it complemented the Internet Protocol (IP). Therefore, the entire suite is commonly referred to as TCP/IP. TCP provides reliable, ordered, and error-checked delivery of a stream of octets (bytes) between applications running on hosts communicating via an IP network. Major internet applications such as the World Wide Web (WWW), email, remote administration, and file transfer rely on TCP. Applications that do not require reliable data stream service may use the User Datagram Protocol (UDP), which provides a connectionless datagram service that emphasizes reduced latency over reliability.

QUIC, pronounced 'quick', is a another transport layer network protocol initially designed, implemented, and deployed in 2012 by Google. QUIC was originally an acronym for "Quick UDP Internet Connections", but has since evolved to be solely the name and no longer an acronym of the protocol. A main goal of QUIC is to improve perceived performance of connection-oriented web applications that are currently using TCP. It does this by establishing a number of multiplexed connections between two endpoints over User Datagram Protocol (UDP). QUIC aims to be nearly equivalent to a TCP connection but with much-reduced latency The IETF's HTTP and QUIC Working Group have made an official request to rename the protocol HTTP/3 in advance of making it a worldwide standard.

RTO is used by TCP and the corresponding timer is named Probe Timeout (PTO) in QUIC, both are used as determining factor of how long the host will wait before retransmitting.

RFC 6298 "Computing TCP's Retransmission Timer", June 2011, describes RTO used by TCP, where chapter 2 describes the algorithm. It may be noted that one second is recommended as the lowest RTO value, but this gas in many implementations have been changed to lower, e.g. 200 ms in Linux.

The document "QUIC Loss Detection and Congestion Control draft-ietf-quic-recovery-18", Jan. 23, 2019, section 6.2.2, describes PTO further.

The PTO is calculated similar to the RTO but the lowest value is not explicitly defined a time value, but based on a clocking granularity of the host platform.

Calculation of RTO and PRO are dependent on the Round Trip Time (RTT) of the involved connection, e.g. between a server, or host, and client. RTT is a well-known concept in data networking but will be explained a bit further before proceeding. To explain it simple, the RTT measures the time from sending a packet from the host to getting the acknowledgment packet from the target client.

Although a known concept in data communication and in particular for IP based networks, RTT can in general be considered a time measure of how fast data can be delivered from a source or sender to a target or receiver, including also an acknowledge of the receipt received by the sender. Further, this time measure may be one that controls for how long the sender, after sending a data packet, will wait for such acknowledgement until considering the data packet as lost and will retransmit it.

Moreover, with the replacement of TCP by QUIC, some existing solutions to the "resource sharing" problem, that the bursts may be used to reduce, may no longer be working. It is also believed that the trend with increased amount of data heavy flows, e.g. so called elephant flows as will be further discussed below, e.g. from streaming media consumption, will continue. In 5G networks, this kind of traffic will likely be increasingly combined with communication to/from Internet of Things (IoT) type of devices, and with a much larger total number of devices to share resource. Hence, it is desirable to come up with new solutions to the resource sharing problem, in particular when/if QUIC will be used and for 5G networks.

An idea underlying embodiments herein is to artificially delay the RTT to thereby increase e.g. RTO or PTO, whereby greater time between bursts can be used without causing re-transmissions.

FIG. 1 is a block diagram schematically depicting an example of a first communication system 10 to be used for discussing embodiments herein and in which embodiments herein may be implemented. The first communication system 10 comprises a multi-access communication network 100 that may be or be based on an IP network, or in other words, a data communication network based on, such as implemented to support, the Internet Protocol, e.g. version 4 or version 6, i.e. IPv4 or IPv6. The figure shows a first client device 120 and a second client device 121 communicatively connected to the multi-access communication network 100, e.g. served by it and/or enable to receive and/or transmit data traffic via the multi-access communication network 100. The figure further shows a server device 130, e.g. a host device, that for example provides data for communication to/from the client devices 120, 121, such as media for streaming, e.g. audio and/or video data, via the multi-access communication network 100. The figure further schematically illustrates a data flow 150 from the server device 130, via the multi-access communication network 100, to the client device 120. The data flow 150 may comprise said data provided by the server device 130. As used herein, multi-access communication network is a communication network that provides access to, e.g. serves, multiple client devices. This may be accomplished by offering the client devices connections and communication to/from and/or via the multi-access communication network 100 using one or more common resources of the multi-access communication network 100, where each resource may be shared by multiple client devices. For example, the first client device 120 may receive the data flow through a resource of the multi-access communication network 100 that is also used by the multi-access communication network 100 to deliver data to the second client device, which resource thus is shared between the first device 120 and the second device 121. Such shared resource(s) may pertain to a network node that both the first device 120 and the second device 121 connect to or via to access the multi-access communication network 100 and e.g. is use for communication of data to/from the multi-access communication network 100. However, the shared resource(s) could additionally or alternatively be a resource associated with another network device or node located further upstream. In any case, such shared resource may be a bottle neck and e.g. a resource that may be overloaded first in case of heavy or certain type of data traffic to/from the multiple devices over the multi-access communication network 100, e.g. due to that a very large number of client devices access or attempt to access the multi-access communication network 100 using the resource.

The figure further shows a network device 110, e.g. corresponding to a network node, comprised in the multi-access communication network 100 and located in the path of the data flow 150. The network device 110 is thus corresponding to a network node that the data flow 150 passes through in its passage or route through the multi-access communication network 100. The network device 110 may comprise said shared resource. However, note that the shared resource may alternatively be associated with another network node, e.g. one that said multiple client devices connect to for accessing the multi-access communication network 100. As realized by the skilled person, the multi-access communication network 100, shown as a cloud in the figure, contains multiple interconnected network nodes although not explicitly shown.

In the figure it is also shown a remote device 141, e.g. remote network node, and a remote computer network 140 that the remote device 141 may be part of or connected to The remote computer network 140 may correspond to a so called computer cloud, or simply cloud, providing certain services. The remote device 141 and/or remote network 140 may e.g. be communicatively connected to the multi-access communication network 100 and e.g. the network device 110, as illustrated in the figure.

Figure 2:
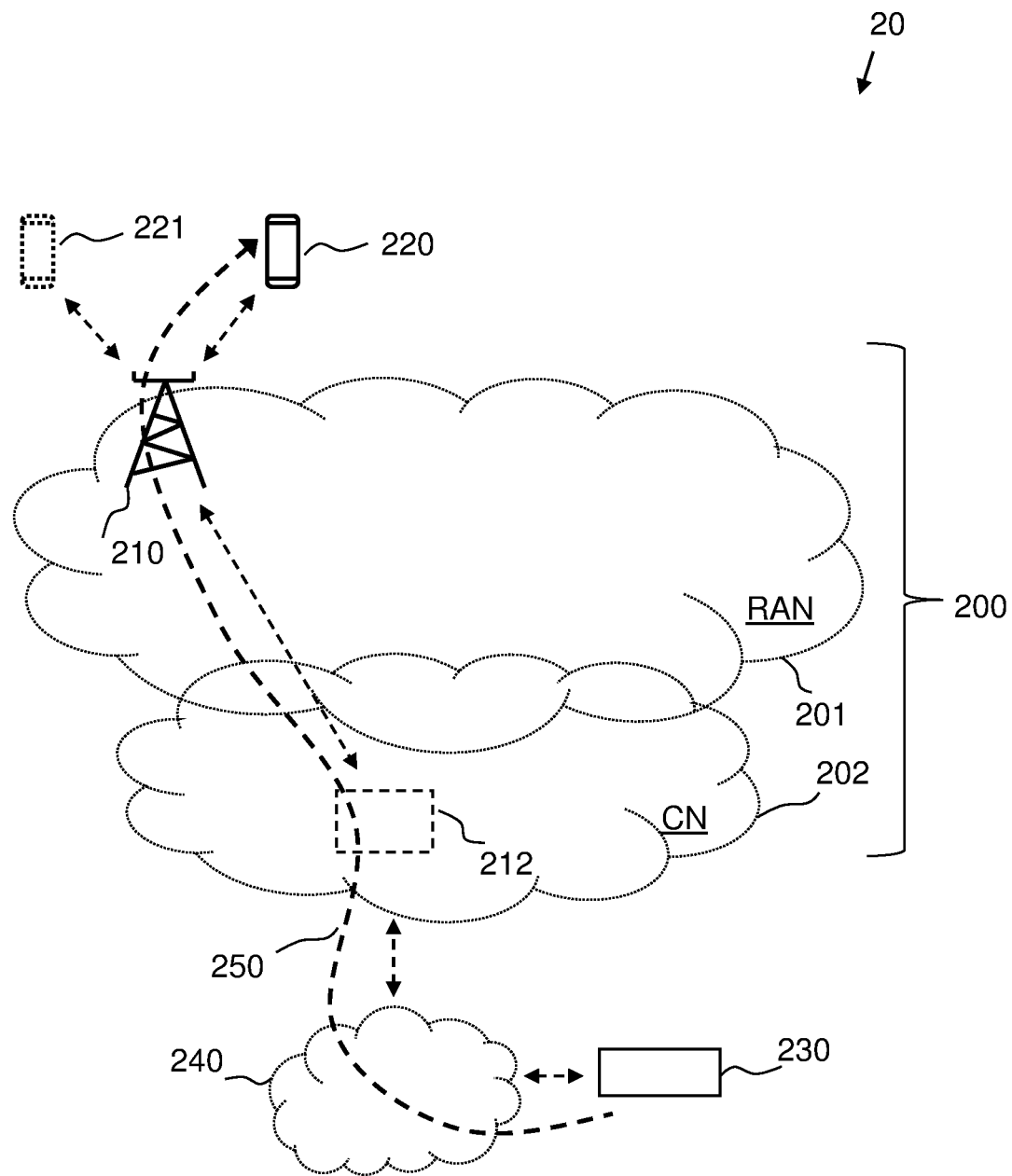
FIG. 2 is another block diagram schematically depicting an example of a second communication system to be used for discussing embodiments herein

FIG. 2 is a block diagram schematically depicting an example of a second communication system 20 to be used for discussing embodiments herein and in which embodiments herein may be implemented. The second communication system 20 comprises a wireless communication network 200, e.g. a telecommunication network. The wireless communication network 200 may comprise a Radio Access Network (RAN) 201 part and a core network (CN) 202 part. The wireless communication network 200 is typically a telecommunication network or system, such as a cellular communication network that supports at least one Radio Access Technology (RAT), e.g. LTE, or 4G, New Radio (NR) that also may be referred to as 5G.

The wireless communication network 200 comprises network nodes that are communicatively interconnected. The network nodes may be logical and/or physical and are located in one or more physical devices. The wireless communication network 200, typically the RAN 201, may comprise a radio network node 210, i.e. a network node being or comprising a radio transmitting network node, such as base station, and/or that are being or comprising a controlling node that controls one or more radio transmitting network nodes. Said radio network node may e.g. be communicatively connected, such as configured to communicate, over, or via, a so called X2-U communication interface or communication link with other radio network nodes (not shown) comprised in the RAN.

Further, the wireless communication network 200, or rather the CN 202 may comprise one or more core network nodes, e.g. a core network node 212, such as a Packet GateWay (P-GW) in LTE/4G or User Plane Function (UPF) node in NR/5G, that may be communicatively connected, such as configured to communicate, over, or via, a communication interface or communication link, such as the so called so called S1-U, with radio network nodes of the RAN 201, e.g. with the radio network node 210.

S1-U, X2-U are IP/UDP based and are examples of user plane protocols used in e.g. LTE and NR wireless communication networks. These user plane protocols can be considered to correspond to application layer protocols in terms of a IP network in general.

Hence, the wireless communication network 200 can be considered to be based on and/or comprise one or more IP networks. For example, the radio network node 210 may be communicatively connected, e.g. via X2-U, to another radio network node in an IP network part of the RAN 201. Moreover, the network node 210 may be communicatively connected, e.g. via S1-U, to the core network node 212. This connection is in an IP network of the wireless communication network 200 that connects the RAN 201 and CN 202.

The wireless communication network 100, or specifically one or more network nodes thereof, e.g. the network node 110, is typically configured to serve and/or control and/or manage one or more wireless communication devices, such as a first communication device 220 and a second communication device 221, in radio coverage areas, i.e. an area where radio coverage is provided for communication with one or more communication devices. The communication device 220 may alternatively be named a wireless communication device, or simply wireless device, and it may correspond to a User Equipment (UE). Each radio coverage may be provided by and/or associated with a particular Radio Access Technology (RAT). The radio coverage may be radio coverage of a radio beam, that simply may be named a beam. As should be recognized by the skilled person, a beam is a more dynamic and relatively narrow and directional radio coverage compared to a conventional cell, and may be accomplished by so called beamforming. A beam is typically for serving one or a few communication devices at the same time, and may be specifically set up for serving this one or few communication devices. The beam may be changed dynamically by beamforming to provide desirable coverage for the one or more communication devices being served by the beam. There may be more than one beam provided by one and the same network node.

The wireless communication network, e.g. the CN 202 thereof, may further be communicatively connected to, e.g. via the core network node 212, and thereby e.g. provide access for said communication device 220, to an external network 240, e.g. the Internet. The external network 240 comprise and are connected to further network nodes, e.g. an external network node 230. External here refers to external vs. the wireless communication network 200. The external network node 230 may e.g. correspond to a server providing service(s) to one or more other internet connected devices, e.g. the communication device 220 that may be provided with access to the external network 230, such as the Internet, via the wireless communication network 200, e.g. specifically via the core network node 220 as mentioned above. The communication device 220 may thus be communicatively connected, e.g. by means of TCP/UDP/IP and an application layer protocol, via the wireless communication network 200 and the external network 240, with the external network node 230. A data flow 250, as indicated in the figure by a dotted line, may e.g. be provided from the external network node 230, via the external network 240 and the wireless communication network 200, to the first communication device 220. The external network node 230 may e.g. be a server providing a video streaming service accessed via an application, or app, executing on the communication device 220. A similar situation could arise with another or the same communication device that is connected to the Internet via a Local Area Network (LAN), e.g. a WiFi network at home, instead of to the wireless communication network 200, e.g. 5G, as discussed above.

In comparison with FIG. 1, the first communication device 220 may be considered to correspond to the first client device 120, the second communication device 221 to the second client device 121, the wireless communication network 200, possibly together with the external network 240 to the, multi-access communication network 100, any one of the radio network node 210 and the core network node 212 may be considered to correspond to the network device 110, the external network node 230 to the server device 130, and the data flow 250 to the data flow 150. In FIG. 2, the shared resource mentioned in connection with FIG. 1, would typically be associated with the radio network node 210 and e.g. a RAN scheduler thereof, and shared by e.g. the first and second communication devices 220, 221.

It may be noted that a server, e.g. a device or network node, corresponding to the server device 130 or the external network node 230 or external network 240, in practice may correspond to one or more physical nodes or devices, e.g. associated with a service through or from which the data flow, e.g. 150 or 250, is provided. The server may alternatively be termed e.g. a host computer, a server system or communication system.

Attention is drawn to that FIG. 1 and FIG. 2 are only schematic and for exemplifying purpose and that not everything shown in the figured may be required for all embodiments herein, as should be evident to the skilled person. Also, a multi-access communication network and wireless communication network that correspond(s) to the ones shown in the figures will typically comprise several further device, network nodes and details, as realized by the skilled person, but which are not shown herein for the sake of simplifying.

Figure 3:
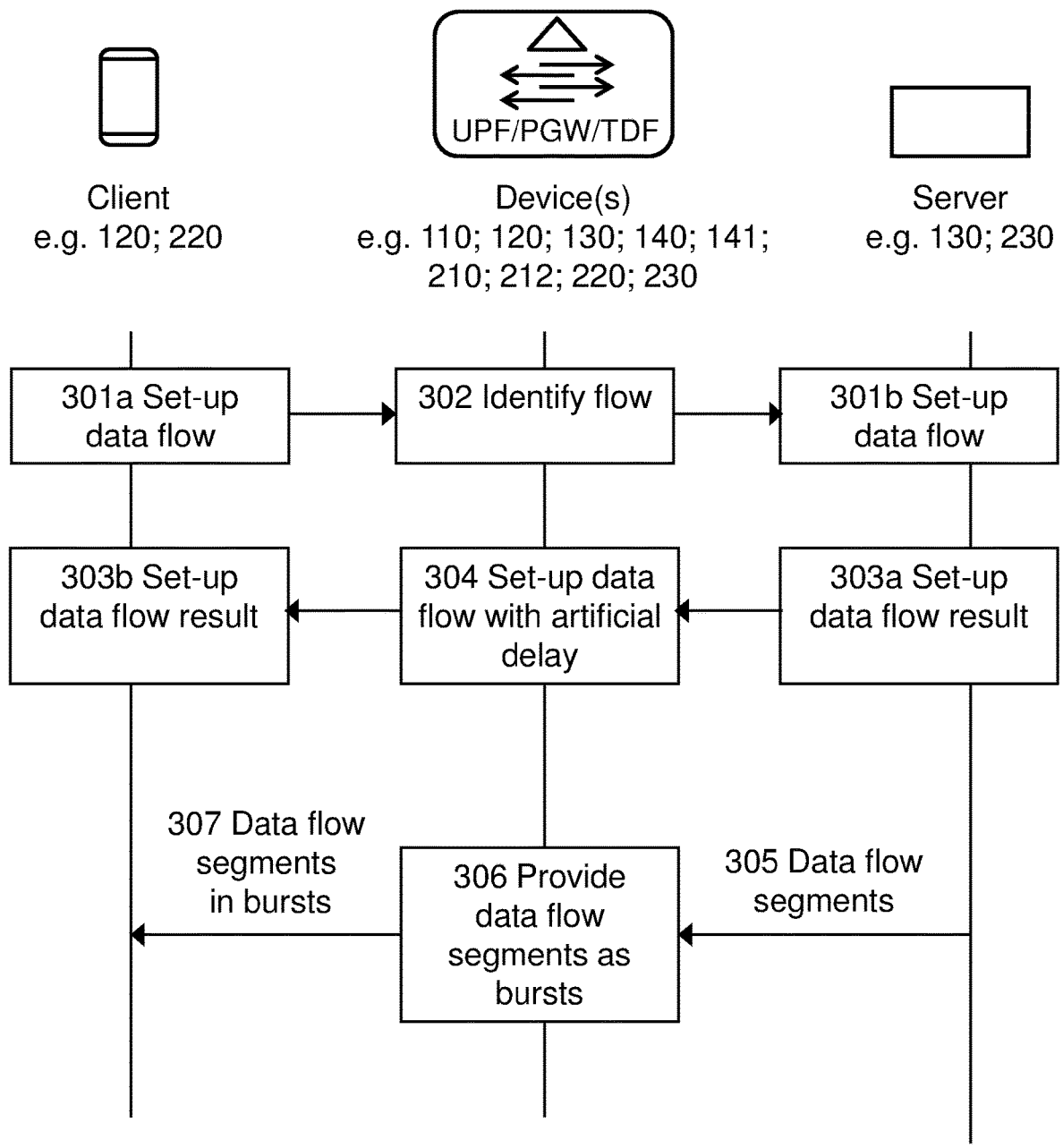
FIG. 3 depicts a combined signaling diagram and flowchart, to be used to discuss embodiments herein.

FIG. 3 depicts a combined signaling diagram and flowchart, which will be used to discuss embodiments herein.

Embodiments herein may be implemented by and/or in one or more network nodes and/or devices, e.g. node in the user plane, such as a node providing or participating in a User Plane Function and/or Traffic Detection Function (UPF/TDF), or be UPF and/or PGW and/or TDF node(s), or more generally one or more nodes involved in provision of a data flow from a server to a client, as exemplified and shown in FIG. 3 as a UPF/PGW/TDF block. Actions relating to the UPF/PGW/TDF block in the figure may e.g. be performed by the network device 110, the radio network node 210 or the core network node 212, but may involve multiple nodes and devices as indicated in the figure.

In the following, in order to simplify, actions that in the figure are associated with the UPF/PGW/TDF block will be described as being performed by the network device 110. Correspondingly, the actions performed by the client in the figure will be described as being performed by the first client device 120 and actions performed by the server in the figure will be described as being performed by the server device 130.

The actions below may be taken in any suitable order and/or be carried out fully or partly overlapping in time when this is possible and suitable.

Actions 301*a,b*

The client device 120 initiates to set up and participate in setting up a data flow, e.g. the data flow 150, with the server device 130, e.g. over the multi-access communication network 100. The set-up flow may e.g. be a connection establishment, e.g. as in TCP, such as of the type called TCP SYN.

Action 302

In response to the set-up of the data flow 150 in the previous action, the network device 110 identifies the flow and may identify that it will or likely will become of a certain type, such as a so called elephant flow, or big flow.

In computer networking, an elephant flow is an extremely large (in total bytes) continuous flow set up by a TCP (or other protocol) flow measured over a network link. Elephant flows, though not numerous, can occupy a disproportionate share of the total bandwidth over a period of time. It is not clear who coined "elephant flow", but the term began occurring in published Internet network research in 2001 when the observations were made that a small number of flows carry the majority of Internet traffic and the remainder consists of a large number of flows that carry very little Internet traffic (mice flows).

Actions 303*a,b*

The server device 130 responds to the set-up of the data flow initiated by the client in Actions 301*a,b*, which involves communicating the result back to the client, e.g. communicating a confirmation or acknowledgement that the data flow is or will be set-up, e.g. together with some information about the data flow.

Action 304

In connection with actions 303a,b and in response to the identification in Action 302, the network device 110 may be involved in setting up the data flow 150 with an artificial delay, e.g. involved in introduction of an artificial delay in RTT between the server device 130 and the client device 120. The network device 130 may e.g. proposedly delay a sequence of data from the server, part of the data flow 150, X milliseconds (ms) to introduce the artificial delay. As explained above, this will have an effect of increasing RTO or PTO, i.e. the server device 130 will "see" or set a higher RTO than else would be the case. For example, the network device 110 may be involved in introducing an artificial delay that is X ms, which may correspond to or be based on a desirable delay between bursts, as will be explained further below. It may be predefined or predetermined, e.g. based on an algorithm used to calculate RTO or PTO, what effect a certain artificial delay of RTT will have on RTO and PTO. In the following it may be assumed that an artificial delay of X ms will have an effect of extending RTO or PTO with X ms as well, although this may thus not necessarily be the case in practise, but may serve to illustrate the principle.

Action 305

In response to the set-up data flow 150, the server device 130 sends data flow segments of the data flow 150 towards the client device 120 under influence of the RTO or PTO that was increased by the artificial delay.

Acton 306

The data flow segments are received by the network device 110, e.g. since it is in the path of the data flow 150 through the multi-access communication network 100. The network device 110 provides the received data flow segments as bursts, or in other words, introduces a delay in the transmission towards the client device so that the data flow segments are transmitted further towards the client device 120 in or as bursts. The delay between bursts should be based on the artificial delay, or in practice it may be that the artificial delay that is set based on a required or desirable delay between bursts. The may e.g. be sent data flow segments for Y ms and then no sending of data flow segments for an idle time period that may be set based on X or as a function of X, e.g. f(X) ms. That is, if not the same as the artificial delay X, the idle time between bursts may be determined by X, e.g. be seen as a function of X, f(X), that is based on the influence the artificial delay has on how long the idle time between bursts can be without causing retransmission. The idle time period, e.g. f(X), should be kept below what causes retransmissions.

Thanks to the artificial delay and thereby extended RTO and PTO, longer delay between the bursts are possible without having to retransmit data due to that retransmission timeout else would have occurred.

Action 306 or corresponding action, should be performed in a device or network node that contains the shared resource that it is desirable to offload temporarily by means of the bursts, or upstream from such device or network node. For example, in case of the of the second communication system 20 in FIG. 2, the shared resource may be in the radio network node 210, and Action 306 may be performed by e.g. in the core network node 212. It may also be the core network node 212 that is involved in Action 304 or corresponding action introducing the artificial delay in the RTT, but it could as well be another node or device in the path of the data flow 250 or node or device communicatively connected to a node or device in the path of the data flow 250, in principle any device or network node with the ability to cause an artificial delay in the RTT for the data flow 250.

Action 307

As a result from Action 306, the client device 120 receives the data flow segments, and thus the data flow 150, in bursts.

To sum up a main idea underlying embodiment herein: Delay RTT artificially so that the server (and client) will have a higher RTT than normal. This will lead to higher RTO and/or PTO. This makes it possible to send elephant flows in burst with longer idle time between bursts without having the risk of re-transmission and reduced congestion window.

Figure 4:
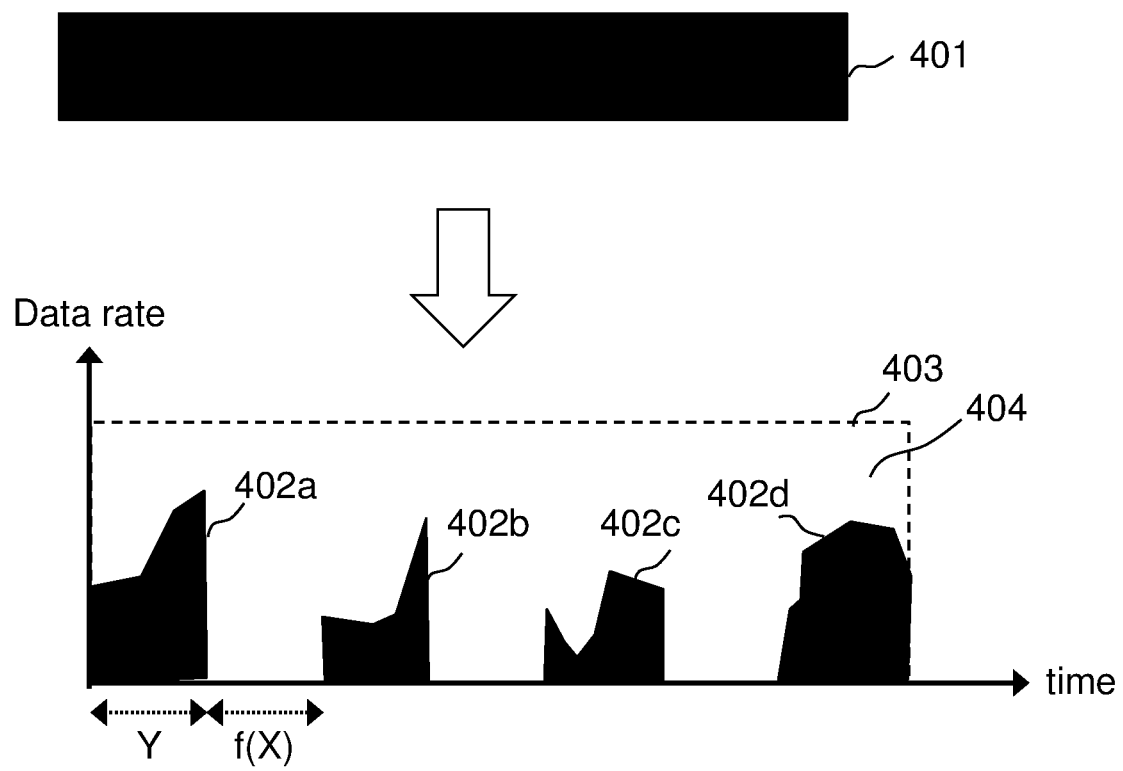
FIG. 4 schematically illustrates an example of how data can be transmitted in data bursts.

FIG. 4 schematically illustrates an example of how data 401 of a dataflow, e.g. of any of the data flows 150, 250, can be transmitted in data bursts 402a-d. Note that data 401 in the figure is schematic, in practice when data is received e.g. as in FIG. 3 by UPF/PGW/TDF from the server, the data will vary and may look like 402a-d but without the idle time in between. Then, when the data it is transmitted from UPF/PGW/TDF towards the client, it may be as the data bursts 402a-d with idle time in between.

During a certain time period a shared resource in multi-access communication network, e.g. associated with a RAN scheduler in the radio network node 220 in the multi-access communication network 200, may be able to transmit a maximum data amount 403 indicated by a dotted square in the figure. The part of the maximum data amount 403 that is not used by the data 401 transmitted as the bursts 402a-d can be used for transmitting other traffic, i.e. the white region within the dotted square indicating the maximum data amount during the time period may represent other data 404 that can be transmitted using the shared resource during the time period. The other data may e.g. contain multiple other kind of traffic and data flows, e.g. resulting from web surfing etc, and are typically associated with other receiving devices than the receiving device of the data 401.

The shared resource may e.g. be bandwidth limited so that at any given time there is a maximum available data rate as indicated by the horizontal dotted line in the figure. If the data 401 of any of the data flows 150, 250 uses this shared resource during the time period, part of the maximal data amount will be used for transmitting the data 401 during the time period. Most straightforward is of course be to transmit data segments of the data 401 as soon as possible when they are received by any node in the path from the data source, e.g. from any of the server device 130 or the external network node 230, to the recipient, e.g. any of first client device 120 or the first wireless communication device 220. However, for reasons discussed above, this may result in that there, during the time period, e.g. at certain time points during it, may be an overload of the shared resource due to that the maximum available data rate is not sufficient for what is to be transmitted with resulting data loss and/or that some time critical data, that e.g. must be deliver in near real time cannot be delivered in time. This can be solved by transmitting the data 401 in bursts as illustrated. Although the data at subperiods when the bursts are transmitted will allocate more of the maximum available data rate, there will be time periods in between when the full maximum available data rate is not utilized for transmitting the data 401 and thus fully available for transmitting other traffic than the data 401.

The bursts may e.g. as illustrated and exemplified above, be transmitted for Y seconds, and then there may be a delay of f(X) seconds, during which time other traffic may fully utilize the resource and e.g. the maximum available bandwidth.

Also as discussed above, embodiments herein and the artificial delay can be used to have a longer idle period, e.g. f(X) between bursts, than else would be possible without causing retransmission of data, which then of course would further load the resource and contribute to the shared resource problem.

Figure 5:
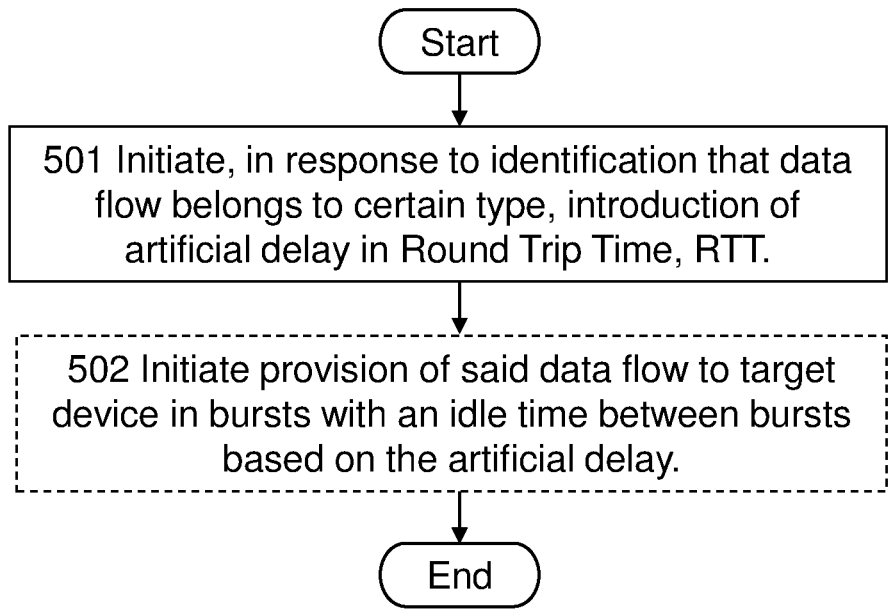
FIG. 5 is a flowchart schematically illustrating embodiments of a first method according to embodiments herein.

FIG. 5 is a flowchart schematically illustrating embodiments of a first method according to embodiments herein. The method is for managing RTT associated with provision of a data flow, e.g. the data flow 150 or 250, from a server device, e.g. corresponding to the server deice 130 or the external network node 230, via a multi-access communication network, e.g. relating to the multi-access communication network 100 or the wireless communication network 200, to a client device, e.g. corresponding to the first client device 120 or the first communication device 220. The method may be performed by one or more devices, e.g. corresponding to the network device 110, the first client device 120, device(s) of the remote computer network 140, the remote device 141, the radio network node 210, core network node 212, first communication device 220, external network node 230 or device(s) of the external network 240. To simplify the following, the network device 110 will be mainly be used as example for performing the method. In general, entities of FIG. 1 will be used as main examples in the following. In some embodiments the method and actions thereof is performed by a system comprising several devices, and e.g. comprising at least relevant parts of the first or second communication system 10, 20. The one or mode devices, when more than a single device perform the method, may be referred to as a system or arrangement, e.g. a control or support system.

Said one or more devices, e.g. the network device 110, are communicatively connected to said multi-access communication network, e.g. 100. The multi-access communication network, e.g. 100, is configured to provide the data flow, e.g. 150, to said client device, e.g. the first client device 120, using a resource of said multi-access communication network, e.g. 100, that is shared by multiple devices, e.g. shared by the first client device 120 and the second client device 121. The shared resource may be such resource as discussed above.

Hence, the resource is shared by multiple devices, including e.g. the client device 120, which devices may be considered served by and/or accessing the multi-access communication network through the resource.

As should be understood the resource shared by the multiple devices is typically a resource that the multi-access communication network, e.g. 100, uses for communication with the multiple devices, e.g. for providing data to the multiple devices. The resource is typically limited and e.g. associated with a bandwidth that is shared between the multiple devices. The resource may further be associated with a particular node or device of the multi-access communication network, e.g. a base station such as the radio network node 210, that serves the multiple devices, e.g. the first and second wireless communication devices 220, 221.

Action 501

Said one or more device, here the network device 110, initiates, in response to identification that the data flow, e.g. 150, belongs to a certain type, introduction of an artificial delay in the RTT.

Said certain type may be associated with data flows that are so called elephant flow, i.e. elephant type of data flows, as mentioned above. Hence, said certain type may be associated with lower real time requirements than other types of data flows using the resource but transports substantially greater data amounts than said other types.

Said identification that the data flow, e.g. 150, may be based on a provision of a measure of data amount carried by the data flow over a certain time period and determination that the measured data amount is greater than a predefined data amount, e.g. indicated by a certain threshold.

Hence, the identification may involve obtaining a measure and/or value of the amount of data during a certain, e.g. predetermined time period, and this measure may be compared to a certain, e.g. predetermined, threshold value. If it is greater than the threshold value, the data flow may be identified as of said certain type, e.g. being an elephant flow.

It may alternatively or additionally be so that the identification may be based on an IP-address or Server Name Indication (SNI), of the sender of the data flow, e.g. server, e.g. the server device 130. It may e.g. be known that certain IP-address(es) or SNI(s) indicate, e.g., is used to carry, an elephant flow. For example, the identification of the data flow as above based on provision of a measure, may result in an IP-address or SNI, which then may be used for the identification.

Initiate identification may include that other device(s) or network node(s) is triggered to perform the actual identification. However, some embodiments, the identification is performed by the same device(s) or node(s) performing the present action. For example, the network device 110 may e.g. send some information about the data flow 150 to the remote device 141 and/or to the remote computer network 140, which performs the actual identification.

Said identification may comprise identification during set up of the data flow, e.g. as discussed above in relation to FIG. 3. However, the method may additionally or alternatively be performed after set up of the data flow, e.g. if it turns out there is a need to apply the method. Hence, to start with the data flow, e.g. 150, may be provided without influence of embodiments herein, but in case it become desirable or needed to increase idle time between bursts to avoid retransmissions, embodiments herein may be applied and the artificial delay be introduced in the RTT.

That is, it may be sensed, or this may be already available information in e.g. a RAN scheduler, if the resource is congested or risk to be congested. With reference to FIG. 4, there may be indication of traffic and data to be delivered using the resource that will or risk to overload the resource, e.g. so the maximum available data rate at some point in time will or risk to be insufficient, e.g. due to that the data 401, as part of the data flow 150, would use part of the data rate. The artificial delay may enable increased idle time between the data bursts 402a-d, whereby this may offload the resource. It need not be the same artificial delay used all the time, instead it may depend, e.g. be based on, how utilized the resource is and/or is about to be, e.g. based on information in e.g. the RAN scheduler, e.g. regarding congestion, such as congestion level. This means that the artificial delay may change over time depending on utilization degree of the resource. Hence, the artificial delay may be based on, e.g. be set or be determined based on, a utilization degree of said resource.

The artificial delay may be in an order of a few hundred milliseconds, such as from 100 ms up to e.g. 500 ms. This may be the case in an initial phases of a connection where a default RTO typically may be set to one second. However, shorter and longer artificial delays than this cannot be ruled out in some situations.

This action may fully or partly correspond to Action 304.

Action 502

Said one or more devices, e.g. the network device 110, may also initiate provision of said data flow, e.g. 150, to, or towards, the client device, e.g. 120, in bursts, e.g. the bursts 402*a-d*, with an idle time between the bursts based on the artificial delay.

As should be realized from the above, the artificial delay will thus result in a longer RTT, or similar measure, than else would be the case. If e.g. the artificial delay is X s, e.g. the RTO or PTO will be extended, i.e. longer until timeout, based on X or as a function of X, e.g. corresponding to but not necessarily X s longer.

Hence, this enables or has the effect that it will take longer, e.g. X s longer, before e.g. the server device 130 considers data packets it has sent as part of the data flow 150 to be lost. Such effect is obtained particularly when the data flow transport is based on IP and TCP or QUIC, or any protocol that uses a retransmission timeout similar to the RTO or PTO, based on RTT or a corresponding measure. In other words, embodiments herein enable more time that can be used to deliver other data using the shared resource, e.g. to other of the multiple devices that share the resource. Without the artificial delay there may be need for increased buffering, e.g. in the multi-access communication network 100 and/or some real-time critical data may not be able to be delivered in time to some client device(s) and/or there would be more retransmissions of data packets that would load the multi-access communication network 100 and also e.g. a server, e.g. the server device 130, that provides the data, but without that this would actually improve anything.

Embodiments herein are beneficially applied in combination with provision of the data flow in bursts to the client, as exemplified above. Thanks to embodiments herein and the artificial delay, the delay between the bursts can be increased, e.g. with X s, without causing retransmissions. The increased time between bursts can be used to communicate data to/from the other multiple devices, or other data to/from the client device, using said resource that is shared, and without causing overload, resulting in e.g. data loss and/or retransmission and/or deteriorated performance in data delivery. Embodiments herein may thereby e.g. free up RAN resources for other flows and thus provide better RAN utilization.

Embodiments herein are further beneficially applied in combination with wireless communication networks, e.g. 5G networks, where the number of devices sharing resources often vary over time as user move and change location, change habits etc, and there is often a resource sharing situation, where devices has to share a limited resource e.g. due to limited capacity and e.g. bandwidth limitations in the RAN, e.g. at base stations, for serving wireless communication devices.

This action may fully or partly correspond to Action 306

Figure 6:
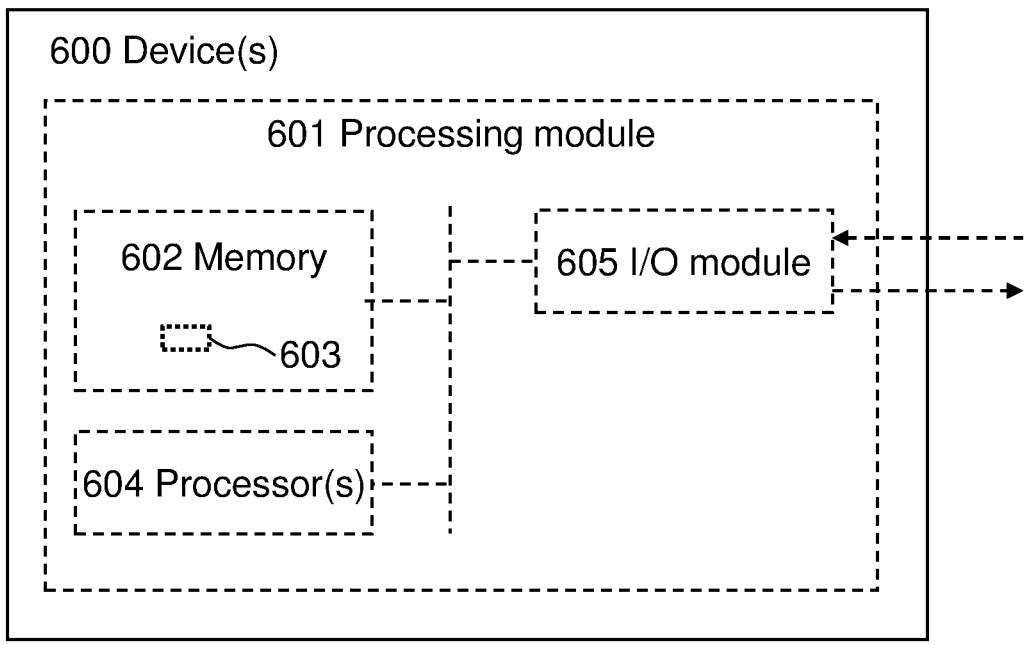
FIG. 6 is a schematic block diagram for illustrating embodiments of how one or more devices may be configured to perform the first method.

FIG. 6 is a schematic block diagram for illustrating embodiments of how one or more devices 600, e.g. said one or more devices discussed above in connection with FIG. 5, including e.g. the network device 110, may be configured to perform the method and actions discussed above in connection with FIG. 5.

Hence, the device(s) 600 is for managing RTT associated with provision of said data flow, e.g. 150, from said server, e.g. the server device 130, via said multi-access communication network, e.g. 100, to said client device, e.g. the first client device 120. Said device(s) 600 being configured to be communicatively connected to said multi-access communication network. The multi-access communication network being configured to provide said data flow, e.g. 150, to said client device, e.g. the network device 120, using a resource of the multi-access communication network that is shared by said multiple devices, e.g. the first and second client devices 120, 121.

The device(s) 600 may comprise a processing module 601, such as a means, one or more hardware modules, including e.g. one or more processors, and/or one or more software modules for performing said method and/or actions.

The device(s) 600 may further comprise memory 602 that may comprise, such as contain or store, a computer program 603. The computer program 603 comprises 'instructions' or 'code' directly or indirectly executable by the device)(s) 600 to perform said method and/or actions. The memory 602 may comprise one or more memory units and may further be arranged to store data, such as configurations and/or applications involved in or for performing functions and actions of embodiments herein.

Moreover, the device(s) 600 may comprise a processor(s) 604, i.e. one or more processors, as exemplifying hardware module(s) and may comprise or correspond to one or more processing circuits. In some embodiments, the processing module(s) 601 may comprise, e.g. 'be embodied in the form of' or 'realized by' processor(s) 604. In these embodiments, the memory 602 may comprise the computer program 603 executable by the processor(s) 604, whereby the device(s) 600 is operative, or configured, to perform said method and/or actions thereof.

Typically the device(s) 600, e.g. the processing module(s) 601, comprises Input/Output (I/O) module(s) 605, configured to be involved in, e.g. by performing, any communication to and/or from other units and/or devices, such as sending and/or receiving information to and/or from other devices, e.g. receiving from the server device 130 and sending towards first client device 120. The I/O module(s) 605 may be exemplified by obtaining, e.g. receiving, module(s) and/or providing, e.g. sending, module(s), when applicable.

Further, in some embodiments, the device(s) 600, e.g. the processing module(s) 601, comprises one or more of an initiating module(s), providing module(s), and identifying module(s), as exemplifying hardware and/or software module(s) for carrying out actions of embodiments herein. These modules may be fully or partly implemented by the processor(s) 604.

The device(s) 600, and/or the processing module(s) 601, and/or the processor(s) 604, and/or the I/O module(s) 605, and/or the initiating module(s) may thus be operative, or configured, to initiate, in response to said identification that the data flow, e.g. 150, belongs to said certain type, introduction of the artificial delay in the RTT.

Further, the device(s) 600, and/or the processing module(s) 601, and/or the processor(s) 604, and/or the I/O module(s) 605, and/or the initiating module(s) may be operative, or configured, to initiate said provision of said data flow, e.g. 150, to the client device, e.g. the first client device 120, in said bursts, e.g. the bursts 402*a-d*, with said idle time between the bursts based on the artificial delay.

Figure 7:
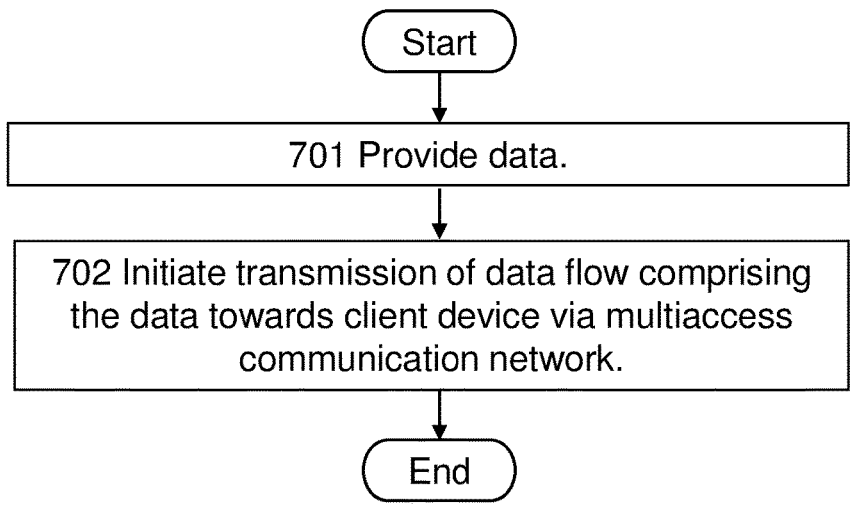
FIG. 7 is a flowchart schematically illustrating embodiments of a second method according to embodiments herein.

FIG. 7 is a flowchart schematically illustrating embodiments of a second method according to embodiments herein. This method is relating to transmission of a data flow, e.g. the data flow 150 or 250, towards a client device, e.g. the first client device 120 or the first wireless communication device 220. The method is performed by a server device, e.g. corresponding to the server device 130 or the external network node 230. The server device 130 will be used as main example in the following.

Action 701

The server device 130 provides data for transport by the data flow 150, or the external network node 230 provides data for transport by the data flow 250.

This action may correspond to that a service provider provides data, e.g. video data, available for access on the server device 130 by client devices, e.g. the first client device 120.

Action 702

The server device, e.g. corresponding to 130 or 230, initiates transmission of the data flow, e.g. 150 or 250, comprising the provided data, towards the first client device 120 via a multiaccess communication network, e.g. the multiaccess communication network 100 or the wireless communication network 200, to which one or more devices for managing RTT associated with provision of the data flow are communicatively connected. Said one or more devices may be the device 600 discussed above in connection with FIG. 6. The multi-access communication network is configured to provide the data flow to the client device using a resource of the multi-access communication network that is shared by multiple devices, that is, as been discussed in the foregoing.

When the server device, e.g. corresponding to 130 or 230, performs the second method, e.g. for delivering a video streaming service to the client device, advantages include that the server device may need to retransmit more seldom than else would be the case, hence saving bandwidth and transmission resources, e.g. reducing the risk of overloaded resource and e.g. better streaming over RAN. The client device, and e.g. a user thereof that is using the video streaming service, may in turn, thanks to this, experience a higher quality of service when using the service, e.g. as provided by a video streaming service provider.

Figure 8:
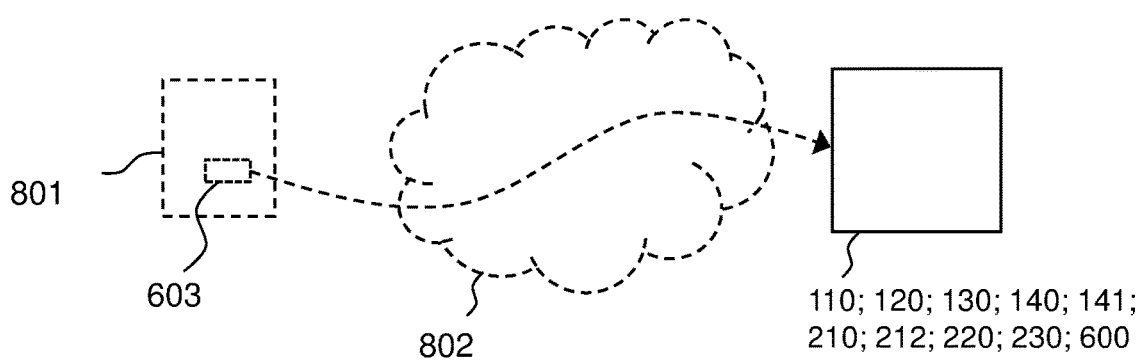
FIG. 8 is a schematic drawing illustrating some embodiments relating to computer program and carriers thereof to cause device(s) to perform said first method and related actions.

FIG. 8 is a schematic drawing illustrating some embodiments relating to computer program and carriers thereof to cause said device(s) 600 discussed above to perform said first method and related actions. The computer program may be the computer program 603 and comprises instructions that when executed by the processor(s) 604 and/or the processing module(s) 601, cause the device(s) 600 to perform as described above. In some embodiments there is provided a carrier, or more specifically a data carrier, e.g. a computer program product, comprising the computer program. The carrier may be one of an electronic signal, an optical signal, a radio signal, and a computer readable storage medium, e.g. a computer readable storage medium 801 as schematically illustrated in the figure. The computer program 603 may thus be stored on the computer readable storage medium 801. By carrier may be excluded a transitory, propagating signal and the data carrier may correspondingly be named non-transitory data carrier. Non-limiting examples of the data carrier being a computer readable storage medium is a memory card or a memory stick, a disc storage medium such as a CD or DVD, or a mass storage device that typically is based on hard drive(s) or Solid State Drive(s) (SSD). The computer readable storage medium 801 may be used for storing data accessible over a computer network 802, e.g. the Internet or a Local Area Network (LAN). The computer program 603 may furthermore be provided as pure computer program(s) or comprised in a file or files. The file or files may be stored on the computer readable storage medium 801 and e.g. available through download e.g. over the computer network 802 as indicated in the figure, e.g. via a server. The server may e.g. be a web or File Transfer Protocol (FTP) server. The file or files may e.g. be executable files for direct or indirect download to and execution on said device(s) 600 to make it perform as described above, e.g. by execution by the processor(s) 604. The file or files may also or alternatively be for intermediate download and compilation involving the same or another processor(s) to make them executable before further download and execution causing said device(s) 600 to perform as described above. The computer program 603 may in some embodiments correspond to a computer program relating to said simulator and/or computer game, when e.g. embodiments herein are integrated within one and the same computer program.

Note that any processing module(s) and circuit(s) mentioned in the foregoing may be implemented as a software and/or hardware module, e.g. in existing hardware and/or as an Application Specific Integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make the node(s) and device(s) to be configured to and/or to perform the above-described methods and actions.

Identification by any identifier herein may be implicit or explicit. The identification may be unique in a certain context, e.g. in the wireless communication network or at least in a relevant part or area thereof.

The term "network node" or simply "node" as used herein may as such refer to any type of node that may communicate with another node in and be comprised in a communication network, e.g. IP network or wireless communication network. Further, such node may be or be comprised in a radio network node (described below) or any network node, which e.g. may communicate with a radio network node. Examples of such network nodes include any radio network node, a core network node, Operations & Maintenance (O&M), Operations Support Systems (OSS), Self Organizing Network (SON) node, etc.

The term "radio network node" as may be used herein may as such refer to any type of network node for serving a wireless communication device, e.g. a so called User Equipment or UE, and/or that are connected to other network node(s) or network element(s) or any radio node from which a wireless communication device receives signals from. Examples of radio network nodes are Node B, Base Station (BS), Multi-Standard Radio (MSR) node such as MSR BS, eNB, eNodeB, gNB, network controller, RNC, Base Station Controller (BSC), relay, donor node controlling relay, Base Transceiver Station (BTS), Access Point (AP), New Radio (NR) node, transmission point, transmission node, node in distributed antenna system (DAS) etc.

Each of the terms "wireless communication device", "user equipment" and "UE", as may be used herein, may as such refer to any type of wireless device arranged to communicate with a radio network node in a wireless, cellular and/or mobile communication system, and may thus be referred to as a wireless communication device.

Examples include: target devices, device to device UE, device for Machine Type of Communication (MTC), machine type UE or UE capable of machine to machine (M2M) communication, Personal Digital Assistant (PDA), iPAD, Tablet, mobile, terminals, smart phone, Laptop Embedded Equipment (LEE), Laptop Mounted Equipment (LME), Universal Serial Bus (USB) dongles etc.

While some terms are used frequently herein for convenience, or in the context of examples involving other a certain, e.g. 3GPP or other standard related, nomenclature, it must be appreciated that such term as such is non-limiting Also note that although terminology used herein may be particularly associated with and/or exemplified by certain communication systems or networks, this should as such not be seen as limiting the scope of the embodiments herein to only such certain systems or networks etc.

As used herein, the term "memory" may refer to a data memory for storing digital information, typically a hard disk, a magnetic storage, medium, a portable computer diskette or disc, flash memory, random access memory (RAM) or the like. Furthermore, the memory may be an internal register memory of a processor.

Also note that any enumerating terminology such as first device or node, second device or node, first base station, second base station, etc., should as such be considered non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of unicasting, one specifically addressed device may receive and encode the transmission. In case of group-casting, e.g. multicasting, a group of specifically addressed devices may receive and decode the transmission.

When using the word "comprise" or "comprising" it shall be interpreted as nonlimiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method, performed by one or more devices, for managing Round Trip Time (RTT) associated with provisioning of a data flow from a server device, via a multi-access communication network, to a client device; the one or more devices being communicatively connected to the multi-access communication network; the multi-access communication network being configured to provide the data flow to the client device using a resource of the multi-access communication network that is shared by multiple client devices; the method comprising:
   initiating, in response to identification that the data flow belongs to a certain type, introduction of an artificial delay in the RTT; and
   initiating the provisioning of the data flow to the client device in bursts with an idle time between the bursts based on the artificial delay.

2. The method of claim 1, wherein the certain type is associated with lower real time requirements than other types of data flows using the resource, but that transports substantially greater data amounts than the other types.

3. The method of claim 1, wherein the identification of the data flow is based on a provision of a measure of data amount carried by the data flow over a certain time period and determination that the measured data amount is greater than a predefined data amount.

4. The method of claim 1, wherein the identification comprises identification during set up of the data flow.

5. The method of claim 1, wherein the artificial delay is based on a utilization degree of the resource.

6. A non-transitory computer readable recording medium storing a computer program product for controlling one or more devices for managing Round Trip Time (RTT) associated with provisioning of a data flow from a server device, via a multi-access communication network, to a client device; the one or more devices being communicatively connected to the multi-access communication network; the multi-access communication network being configured to provide the data flow to the client device using a resource of the multi-access communication network that is shared by multiple client devices; the computer program product comprising program instructions which, when run on processing circuitry of the one or more devices, causes the one or more devices to:
   initiate, in response to identification that the data flow belongs to a certain type, introduction of an artificial delay in the RTT; and
   initiate the provisioning of the data flow to the client device in bursts with an idle time between the bursts based on the artificial delay.

7. One or more devices for managing Round Trip Time (RTT) associated with provision of a data flow from a server device, via a multi-access communication network, to a client device; the one or more devices being configured to be communicatively connected to the multi-access communication network; wherein the multi-access communication network is configured to provide the data flow to the client device using a resource of the multi-access communication network that is shared by multiple client devices; the one or more devices comprising:
   processing circuitry;
   memory containing instructions executable by the processing circuitry whereby the one or more devices are operative to:
      initiate, in response to identification that the data flow belongs to a certain type, introduction of an artificial delay in the RTT; and initiate provision of the data flow to the client device in bursts with an idle time between the bursts based on the artificial delay.

8. The one or more devices of claim 7, wherein the certain type is associated with lower real time requirements than other types of data flows using the resource but that transports substantially greater data amounts than the other types.

9. The one or more devices of claim 7, wherein the identification of the data flow is based on a provision of a measure of data amount carried by the data flow over a certain time period and determination that the measured data amount is greater than a predefined data amount.

10. The one or more devices of claim 7, wherein the identification comprises identification during set up of the data flow.

11. The one or more devices of claim 7, wherein the artificial delay is based on a utilization degree of the resource.

12. A method, performed by a server device, relating to transmission of a data flow towards a client device, wherein the method comprises:
providing data to be transported by the data flow; and
initiating transmission of the data flow comprising the provided data, towards the client device via a multi-access communication network to which one or more devices for managing Round Trip Time (RTT) associated with provisioning of the data flow are communicatively connected; the multi-access communication network being configured to provide the data flow to the client device using a resource of the multi-access communication network that is shared by multiple client devices; and
wherein the one or more devices are configured to initiate, in response to identification that the data flow belongs to a certain type, introduction of an artificial delay in the RTT and to initiate the provisioning of the data flow to the client device in bursts with an idle time between the bursts based on the artificial delay.

13. The method of claim 12, wherein the certain type is associated with lower real time requirements than other types of data flows using the resource but that transports substantially greater data amounts than the other types.

14. The method of claim 12, wherein the identification of the data flow is based on a provision of a measure of data amount carried by the data flow over a certain time period and determination that the measured data amount is greater than a predefined data amount.

15. The method of claim 12, wherein the identification comprises identification during set up of the data flow.

16. The method of claim 12, wherein the artificial delay is based on a utilization degree of the resource.

* * * * *